United States Patent [19]
Yoshida

[11] 3,812,733
[45] May 28, 1974

[54] TENSIONING DEVICE FOR FLEXIBLE MEMBERS

[75] Inventor: Hiroshi Yoshida, Urawa, Japan

[73] Assignee: Yamakyu Chan Kabushiki Kaisha, Tokyo-to, Japan

[22] Filed: May 4, 1973

[21] Appl. No.: 357,519

[30] Foreign Application Priority Data
May 17, 1972  Japan............................ 47-56823[U]
May 17, 1972  Japan............................ 47-56824[U]

[52] U.S. Cl...................... 74/242.11 S, 74/242.1 A
[51] Int. Cl............................................... F16h 7/12
[58] Field of Search................ 74/242.11 S, 242.1 A

[56] References Cited
UNITED STATES PATENTS
3,626,776  12/1971  Staudinger et al............ 74/242.11 S Primary Examiner—Leonard H. Gerin
Attorney, Agent, or Firm—Eric H. Waters

[57] ABSTRACT

A flexible elongated member such as a power transmission belt or chain which has a tendency to slacken during use can be automatically tensioned by a device comprising a support structure, a sliding member slidable in the support structure, an engaging member secured to the sliding member and adapted to engage the flexible member, resilient means biasing the sliding member in an advancing direction relative to the support structure, a series of indentations formed on one side of the sliding member, and detent means mounted in the support structure to engage one of the indentations. The detent means is capable of selectively taking two positions in one of which the sliding member is prevented from advancing and in the other of which the sliding member is prevented from retracting.

13 Claims, 12 Drawing Figures

3,812,733

TENSIONING DEVICE FOR FLEXIBLE MEMBERS

BACKGROUND OF THE INVENTION

This invention relates generally to devices for tightening or tensioning elongated flexible members such as power transmission belts and chains, and more particularly to a tensioning device for applying tension to a flexible member of the above stated kind whereby tension in the flexible member is automatically maintained.

Widely known are belt and chain tensioners which comprise means for engaging a flexible member, such as a power transmission belt or chain, at its free running span, and means for urging the engaging means onto the surface of the flexible member, whereby the free running span of the flexible member is shifted transversely of the span, and a tension is thereby applied to the flexible member.

In such a belt or chain tensioner, if it is desired to adjust the tension, supporting means for the tensioner must be readjusted under the existing tension of the belt or chain. This requires a considerably laborious procedure.

It has also been contemplated to provide a resilient member between the engaging means and the supporting means for automatically adjusting the transverse displacement of the free running span of the belt or chain. However, such a procedure was found disadvantageous because severe vibration of the running span tends to be caused by the existence of the resilient member.

SUMMARY OF THE INVENTION

Therefore, an object of the present invention is to provide an automatic belt or chain tensioner which is free of the drawbacks accompanying the conventional tensioners.

More specifically, an object of the invention is to provide an automatic belt-or-chain tensioner whereby the tension of a belt or chain can be automatically readjusted to compensate for any elongation caused after a considerable period of operation.

Another object of the present invention is to provide an automatically operable belt or chain tensioner wherein harmful vibration of the belt or chain is prevented despite the provision of a resilient member for creating the tension.

A further object of the invention is to provide an improved belt or chain tensioner which can be locked in a retracted condition and in which replacement of the belt or chain or installation of the tensioning device in place can be much facilitated.

An additional object of the invention is to provide an improved belt or chain tensioner wherein the direction of pressing the belt or chain by the tensioner can be easily reversed.

These and other objects of the invention can be achieved by an improved belt or chain tensioner which comprises a support structure, a sliding member supported in the structure to be slidable therein, an engaging member mounted on the sliding member and adapted to engage the belt or chain, resilient means biasing the sliding member in an advancing direction relative to the support structure, means forming a series of indentations in the side surface of the sliding member, detent means mounted in the structure to engage one of the indentations, the detent means being capable of selectively taking a first position wherein the detent means resists the movement of the sliding member in the advancing direction but allows the same to move in a retracting direction opposite to said advancing direction and a second position wherein the detent means resists the movement of the sliding member in the retracting direction but allows the same to move in the advancing direction, and means for holding the detent means in the respective positions.

The nature, principle, and utility of the invention will be more clearly understood from the following detailed description of the invention when read in conjunction with the accompanying drawings, in which like parts are designated by like reference numerals and characters.

DETAILED DESCRIPTION OF THE INVENTION

Figure 1:
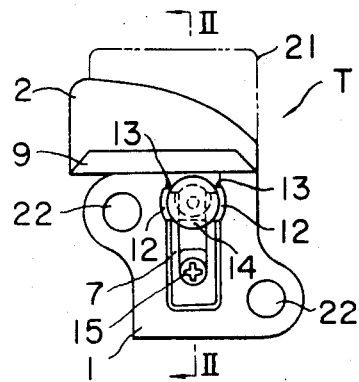
FIG. 1 is a side view of an example of a belt or chain tensioner constituting an embodiment of the present invention.

Referring now to FIGS. 1 through 4, there is indicated an example of a tensioning device for applying tension to a flexible member such as a power transmission belt or a chain which is generally designated by reference numeral T and is preferably applicable to a timing belt in an automobile engine. This example of the tensioner comprises a structural support in the form of a solid casing 1, a substantially cylindrical sliding member 3 slidable in the casing 1 and rigidly coupled with an belt-engaging member or a pusher 2 in this particular example, and a resilient member 4 disposed in the sliding member 3 thereby to urge the sliding member 3 outwardly relative to the casing 1. The engaging member or pusher 2 is made in the form of a shoe consisting of a hard synthetic rubber and rigidly bonded to a base plate 9 which is tightly secured to the sliding member 3.

The resilient member 4 is in the form of a coiled spring provided within an internal hollow space of the sliding member 3 with one end thereof abutting the bottom wall of the casing 1, whereby the sliding member 3 is constantly urged outward or upward as viewed in the drawings by the resilient member 4.

On one side surface of the sliding member 3, there are provided a single indentation 5 and a series of indentations 6, both being arranged in a line parallel to the vertical axis of the sliding member 3. The indentation 5 is of a saw-tooth configuration defined by a lower radially extending wall and an upper inclined wall, and each of the indentations 6 is also of a saw-tooth configuration defined by an upper radially extending wall and a lower inclined wall. A spacing projection 10 is formed between the indentation 5 and an indentation 6 closely adjacent thereto.

A detent 8 is formed on an end of a cylindrical piece 1 by cutting away a semi-cylindrical portion from the end and leaving another semi-cylindrical portion. The detent 8 has a profile complemental with each of the saw-tooth shaped indentations 5 and 6.

The cylindrical piece 11 is inserted in a hole bored through the side wall of the casing 1 at a position laterally opposite to the indentations 5 and 6. The cylindrical piece 11 is freely slidable in its axial direction and also rotatable around its axis. Stopper lugs 12 are provided projecting from both sides of an end of the cylindrical piece 11. Normally, the cylindrical piece 11 is urged toward the sliding member 3 by a spring 7 so that the lugs 12 are engaged respectively in recesses 13 formed in the side wall of the casing 1, and any rotation of the cylindrical piece 11 around its axis can thereby be prevented.

The cylindrical piece 11 is further provided with a handle 14 on its outer end, whereby the cylindrical piece 11 may be pulled out against the force of the spring 7 from a position where the detent 8 engages the indentation 5, and by rotating the cylindrical piece 11 around its axis through 180°, it may be moved inwardly by the force of the spring 7 into engagement with one of the indentations 6.

The spring 7 may be a leaf spring of U-shaped configuration having a bifurcated end. The other end of the spring 7 is fixed to the outer surface of the casing 1 by means of, for instance, a screw 15. The bifurcated end of the spring 7 is extended on both sides of a stem portion of the handle 14 so that the handle 14 and the cylindrical piece 11 are urged inwardly or rightwardly as viewed in FIGS. 2 and 4, and the detent 8 is engaged with one of the indentations 5 and 6.

At a substantially opposite side of the casing 1 relative to the cylindrical piece 11, a set screw 16 is screwed into the side wall of the casing 1, and the inner end of the set screw 16 is introduced into an elongated groove 17 formed axially along the side wall of the sliding member 3. Since the end of the set screw 16 is engaging with the elongated groove 17, rotational movement of the sliding member 3 around the axis thereof relative to the casing 1 is prevented so that the detent 8 always confronts one of the indentation 5 and 6. Reference numeral 18 designates an oil supply passage provided in a lower portion of the casing 1, which is in communication through a slot 19 formed in the lower end of the sliding member 3 with the interior of the same, which is in turn in communication with an oil discharge passage 20 bored upwardly through the sliding member 3 and the pusher 2. Through the passage 20, oil is supplied to the upper surface of the pusher 2 whereby the surface of the pusher 2 engaging a flexible power transmission member, for example a belt, is lubricated suitably by the oil.

A plate 21 may be provided beside the pusher 2 for preventing the belt or chain from straying off the upper surface of the pusher 2, and, furthermore, a required number of bolt holes 22 may be provided through the casing 1 and the plate 21 for securing the tensioning device to a stationary mounting frame.

Figure 5:
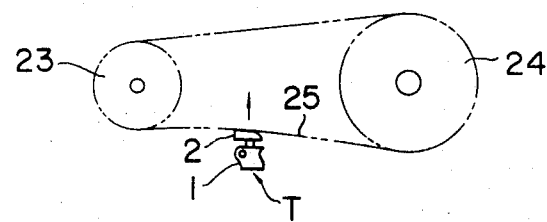
FIG. 5 is a schematic side view showing an application of this example to an endless power transmission belt or chain.

The belt or chain tensioner as described above may be used as shown with respect to one example in FIG. 5. In this particular example, a flexible power transmission member such as an endless power belt or chain 25 is passed around two pulleys or sprocket wheels 23 and 24, and the tensioner T is mounted on a stationary mounting frame (not shown) in such a manner that the pusher 2 of the tensioner urges, under the action of the spring 4, a free running span of the endless member 25 in the arrow marked direction thereby tensioning the endless member 25.

Figure 2:
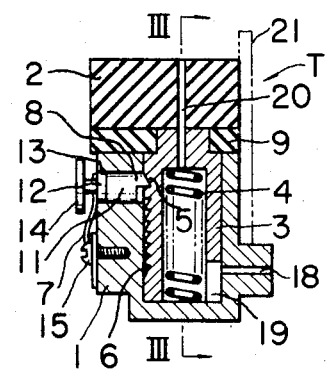
FIG. 2 is a sectional view of the same example taken along the line II—II in FIG. 1 and viewed in the arrow direction.
Figure 3:
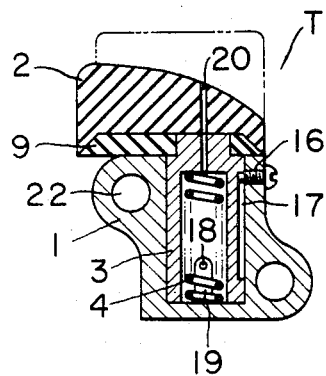
FIG. 3 is a sectional view taken along the line III—III in FIG. 2 and viewed in the arrow direction.

When it is desired to install the tensioner T on a mounting frame or to replace the tensioner installed in position by another one, the detent 8 is brought into engagement with the indentation 5 as shown in FIG. 2 so that the movement of the sliding member 3 outwardly of the casing 1 under the action of the spring 4 is prevented by the engagement of the lower radially extending wall of the indentation 5 with the detent 8 and the installation or the replacement of the tensioner T is thereby much facilitated.

Figure 4:
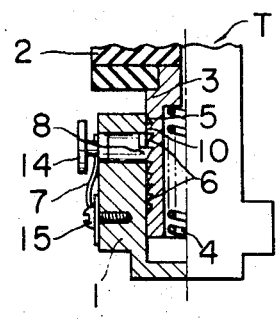
FIG. 4 is a fragmentary sectional view similar to FIG. 2, showing the tensioner shown in FIG. 1 which is in a mode of operation different from that shown in FIG. 2.

After the installation or replacement of the tensioner, the cylindrical piece 11 is manually turned through 180° by means of the handle 14 so that the detent 8 is brought into engagement with one of the indentations 6 as shown in FIG. 4. When so engaged, the detent 8 is easily pushed radially outwardly against the force of the spring 7 by the lower inclined walls of the indentations 6, and the sliding member 3 is thereby expelled outwardly of the casing 1 by the force of the spring 4 until the pusher 2 attached to the upper end of the sliding member 3 resiliently rests on a free running span of the flexible member 25 as shown in FIG. 5 so that the transmission member 25 is suitably tensioned.

As described hereinbefore, when the member 25 is driven in one direction in its operation, the free running span of the member may undergo severe lateral vibration because of the existence of the resilient means, such as the sping 4. Such a vibration can be effectively eliminated by the cooperative action of the detent 8 with the indentations 6. Under the retraction-preventing action or ratchet action of the cooperating detent 8 and indentations 6, the pusher 2 is simply allowed to move outward in the arrow marked direction in FIG. 5 when any vibration transverse to the running direction of the member 25 is caused to occur. Thus, the pusher 2 moves outwardly of the casing 1 as long as the resilient force of the spring 4 exceeds the counter-acting force of the member 25 until both forces are finally balanced with each other.

Since the initial position of installation of the tensioner T is so selected that the above described balancing of forces is obtained by a comparatively small quantity of extension of the sliding member 3 outwardly of the casing 1, any future elongation of the flexible member 25 during its operation can be compensated for by a further lateral shift of the free running span of the member 25 caused by a further extension of the sliding member 3 outwardly of the casing 1, whereby the tension of the power transmitting flexible member can be automatically kept constant.

Figure 6:
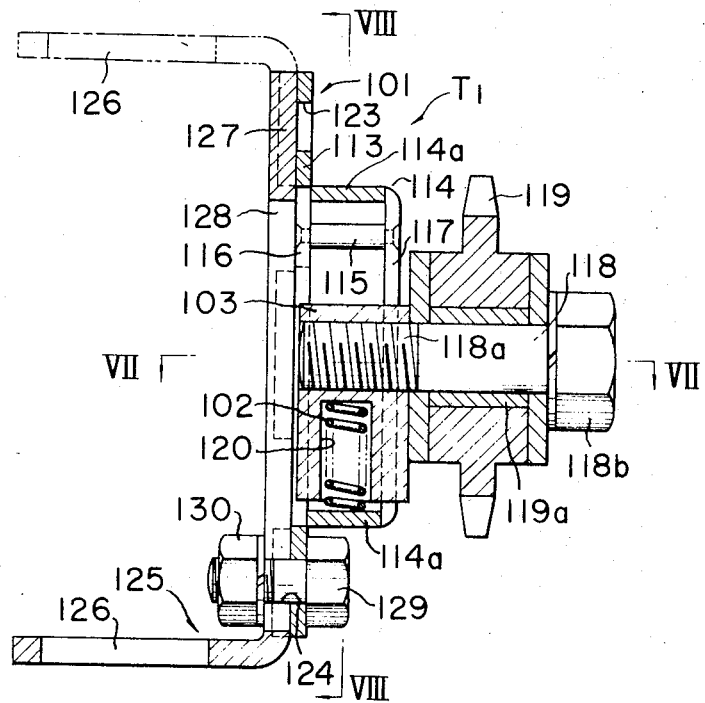
FIG. 6 is a vertical section of a belt or chain tensioner constituting another example of the invention.
Figure 7:
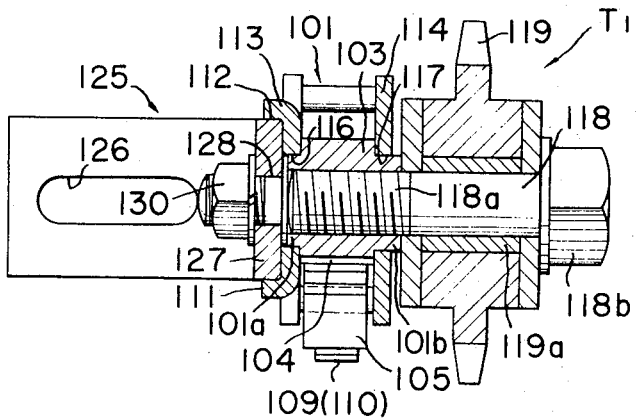
FIGS. 7 and 8 are sectional views of the same example taken along the lines VII—VII and VIII—VIII, respectively and viewed in the arrow directions.
Figure 8:
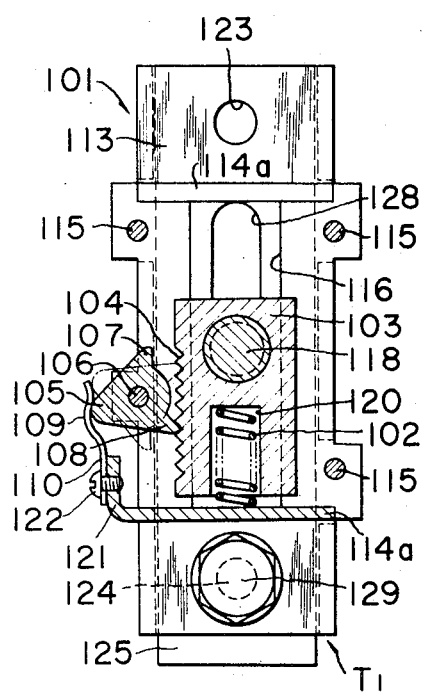
Figure 9:
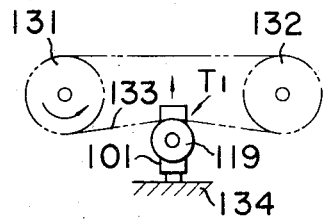
FIGS. 9, 10, 11 and 12 are schematic diagrams showing various applications of the second example of the belt or chain tensioner.

An alternative example of the tensioner which constitutes another embodiment of the invention is shown in FIGS. 6 through 8, inclusive.

In this example, the tensioner generally designated by reference numeral $T_1$ is provided with a frame 101 which comprises a guide plate 113, two side portions 111 of which are partly bent as shown in FIG. 7 thereby to form two vertically disposed guide walls 112, and a U-shaped member 114, the guide plate 113 and the U-shaped member 114 being rigidly coupled with each other by means of, for instance, rods 115 or the like. A sliding member 103 is freely slidably received in the frame 101 with end parts 101a and 101b thereof engaging in elongated slots 116 and 117 provided through the guide plate 113 and the U-shaped member 114, respectively. The sliding member 103 is further provided with a threaded hole with which a threaded part 118a of a bolt 118 is in screw-engagement. The bolt 118 has a head 118b and extends perpendicularly to the sliding direction of the sliding member 103. On the bolt or shaft 118, a sprocket wheel 119 is mounted through a suitable bearing bush 119a so that the sprocket wheel 119 can be freely rotated around the shaft 118. The upper and lower limbs 114a of the U-shaped member 114 define the movable range of the sliding member 103.

A compressed spring 102 is disposed in a cavity 120 formed in the lower portion of the sliding member 103, and the lower end of the spring 102 is supported by the lower limb 114 of the member 114. As most clearly shown in FIG. 8, a constraining member 105 of a generally triangular configuration is provided swingable around a pivot pin 106 which also extends between the guide plate 113 and U-shaped member 114 in parallel with the bolt 115.

First and second vertexes of the triangular constraining member 105 are formed into detents 107 and 108, and either one of the areas at both sides of the third vertex is depressed by a bent end portion 109 of a leaf spring 110, the other end of which is fixed to a flange 121 of the frame 101 by means of, for instance, a screw 122.

A series of indentations 104, each having a configuration of a right-angled equilateral triangle, are provided along one side of the member 103 confronting the constraining member 105. The series of indentations 104 extend along the length of the sliding member 103 in such a range that even in the most raised or advanced condition of the sliding member 103, the first detent 107 may engage one of the indentations 104, and even in the most lowered or retracted condition of the sliding member 103, the second detent 108 may engage another one of the series-arranged indentations 104. A pair of bolt holes 123 and 124 are symmetrically provided at an upper part and a lower part of the guide plate 113.

The frame 101 is mounted on an L-shaped mounting adapter or bracket 125 which includes a leg portion having an elongated bolt hole 126 and an arm portion 127 freely insertable between the vertical guide walls 112 in the guide plate 113. An elongated bolt slot 128 is provided in the arm portion 127 of the L-shaped mounting bracket 125 so that the hole 128 aligns with either one of the belt holes 123 and 124 symmetrically provided in the guide plate 113. The frame 101 can thus be secured to the arm portions 127 of the L-shaped mounting bracket at an arbitrary position along the arm portion by means of a bolt 129 and a nut 130.

As will hereinafter be described in more detail with reference to FIGS. 9 through 12, the sprocket wheel 119 engages a flexible power transmission member or an endless chain 133 passed around two sprocket wheels 131 and 132, and the L-shaped mounting bracket 125 for mounting the chain tensioner $T_1$ of this example is secured to a stationary structural 134.

When the constraining member 105 is swung around its pivot pin 106 to a position as indicated by full lines in FIG. 8, with the bent portion 109 of the leaf spring 110 acting against the upper side of the third vertex of member 105 to urge the same counterclockwise as viewed in FIG. 8, the second or lower detent 108 engages one of the indentation 104, and upward movement of the sliding member 103 under the action of the compression spring 102 is constrained by the engagement between detent 108 and one of the indentations 104. More specifically, a perpendicular from the center of the pivot pin 106 to the side surface of the sliding member 103 is shorter than the distance measured from the center of the pivot pin 106 to the tip of the engaging detent 108. Thus, if the sliding member 103 is further depressed, the detent 108 is swung around the pivot pin 106 away from the member 103, and the indentations 104 as well as the sliding member 103 is allowed to retract or descend as viewed in FIG. 8.

On the other hand, when the constraining member 105 is swung to the position shown by chain lines in FIG. 8 in which the other side of the third vertex is acted upon by the bent portion 109 of the spring 110 with the member 105 urged clockwise as viewed in FIG. 8, the detent 107 is now engaged with one of the indentations 104. The sliding member 103 is thus movable upward by the compression spring 102 with the detent 107 moved away from the member 103 and the indentations of the sliding member 103 riding over the detent 107.

In this condition, however, if an attempt is made to depress the sliding member 103 toward the retracted position, the detent 107 will firmly seize one of the indentations 104, and the retraction of the sliding member 103 will thereby be prevented.

Thus, it will be apparent that the chain tensioning device $T_1$ as described above can be easily installed by presetting the constraining member 105 in a position shown by the full lines in FIG. 8, wherein, the projection of the sliding member 103 from the frame 101 is inhibited. It will also be apparent that in this condition the mounting bracket 125 carrying the tensioning device can be easily secured to the stationary structure 134 as shown in FIGS. 9 through 12.

When the constraining member 105 is thereafter moved to the other position indicated by chain lines in FIG. 8, the sliding member 103 constantly urged by the spring 102 is pushed upward until the sprocket wheel 119 carried on the sliding member engages the endless chain 133 thereby to urge the free running span of the chain 133 transversely of its running direction. As a result, the tension of the endless chain 133 passed around the sprocket wheels 131 and 132 is elevated to a desired value.

In this case, if the free running span of the chain tends to vibrate in transverse directions, the sliding member 103 carrying the sprocket wheel 119 acting on the span will be advanced in the frame 101, and the vibration will soon be damped.

When it is required to replace the chain 133 or repair its essociated parts, the constraining member 105 is brought back to a position indicated by full lines in FIG. 8, and then the sliding member 103 is retracted together with the sprocket wheel 119 to the positions shown in the same figure. The sliding member 103 is thus prevented from advancing and the maintenance is facilitated.

Figure 12:
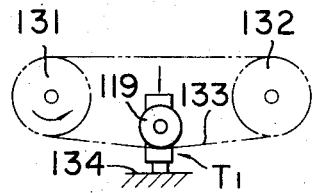

When the frame 101 is secured to the mounting piece 125 inversely as shown by chain lines in FIG. 6, the chain tensioner $T_1$ can be installed internally between the two free running spans of the endless chain 133 as shown in FIG. 12, and one of the two free running spans may be pressed outwardly by means of the sprocket wheel 119 of the chain tensioner $T_1$ for the adjustment of the tension of the chain 133.

Figure 10:
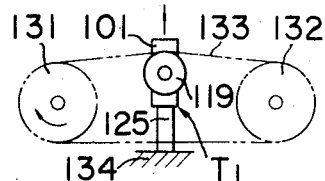
Figure 11:
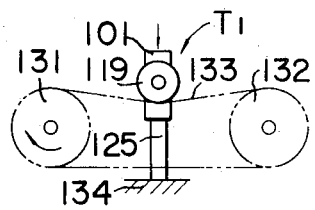

Furthermore, when the mounting position of the frame 101 relative to the mounting piece 125 is selected suitably, the chain tensioner $T_1$ of this example may be installed as shown in FIGS. 10 or 11 depending on which of the two sprocket wheel 131 and 132 is a driving sprocket.

Although the invention has been described with respect to preferred embodiments thereof, it will be apparent to these skilled in the art that various modifications may be carried out thereon without departing from the scope of the invention. For instance, an engaging member in the form of a shoe employed in the first embodiment of this invention may also be employed in the second embodiment of the invention instead of the shaft 118 and the sprocket wheel 119 in combination, or vice versa.

I claim:

1. A device for tensioning elongated flexible members such as power transmission belts and chains comprising:
   a support structure,
   a sliding member supported in said structure and being slidable therein,
   an engaging member mounted on said sliding member and adapted to engage said a flexible member,
   resilient means biasing said sliding member in an advancing direction relative to said support structure,
   means forming a series of indentations in the side surface of said sliding member,
   detent means mounted in said structure to engage one of said indentations, said detent means being capable of selectively taking a first position wherein the detent means resists the movement of the sliding member in said advancing direction but allows the same to move in a retracting direction opposite to said advancing direction and a second position wherein the detent means resists the movement of the sliding member in said retracting direction but allows the same to move in said advancing direction, and
   means for holding said detent means in said respective positions.

2. A device as set forth in claim 1 wherein said detent means is a cylindrical piece which is displaceable toward and away from the indentations and transversely of said directions and has a detent pawl on the end thereof confronting the indentations, said cylindrical piece being turnable around its axis through 180° between said first and second positions.

3. A device as set forth in claim 2 wherein said indentations comprises at least one first indentation configured to be engaged by the detent pawl in said first position and cooperating with the detent pawl to prevent the movement of the sliding member in said advancing direction, and a plurality of second indentations each configured to be engaged by the detent pawl in said second position and cooperating with the detent pawl to prevent the movement of the sliding member in said retracting direction.

4. A device as set forth in claim 3 wherein said first and second indentations are arranged in series with respect to said advancing direction.

5. A device as set forth in claim 1 wherein said support structure is a solid casing having therein a bore in which said sliding member and said resilient means are disposed.

6. A device as set forth in claim 1 wherein said engaging member is in the form of a shoe adapted to slidingly engage said flexible member.

7. A device as set forth in claim 6 wherein said shoe has means for supplying lubricant therethrough from within the solid casing onto the surface of the shoe.

8. A device as set forth in claim 2 wherein said holding means comprises a spring urging said cylindrical structure and therefore its detent pawl into engagement with said indentations, and means for preventing the rotation of said cylindrical piece in each of said first and second positions.

9. A device as set forth in claim 1 wherein said detent means is a pivotally supported substantially triangular member having a pair of detent pawls located respectively on two vertexes thereof, said triangular member being rockable selectively between said first position wherein one of the detent pawl engages one of the indentations and said second position wherein the other detent pawl engages one of the indentations.

10. A device as set forth in claim 9 wherein each of said indentations is of an equilateral triangular configuration, and the distance between the pivot axis of said triangular member and the indentations is less than the length between said pivot axis and the free end of each detent pawl.

11. A device as set forth in claim 1 wherein said support structure is a frame having guide slots for slidably accomodating said sliding member.

12. A device as set forth in claim 11 wherein said engaging member is in the form of a sprocket wheel rotatably supported thereon and being adapted to engage said flexible member.

13. A device as set forth in claim 9 wherein said holding means is a spring urging said triangular member selectively into any of said first and second positions.

* * * * *